INVENTORS.
G. DONALD HENDRICKS
FRANK ARTHUR PEARSON
GEORGE LELAND RAMBO
BY Bruno C Lechler
Attorney INVENTORS.
G. DONALD HENDRICKS
FRANK ARTHUR PEARSON
GEORGE LELAND RAMBO
BY Bruno C. Lechler
Attorney INVENTORS.
G. DONALD HENDRICKS
FRANK ARTHUR PEARSON
GEORGE LELAND RAMBO
BY Bruno C. Lechler
Attorney INVENTORS.
G. DONALD HENDRICKS
FRANK ARTHUR PEARSON
GEORGE LELAND RAMBO
BY Bruno C. Lechler
Attorney March 11, 1958 G. D. HENDRICKS ET AL 2,826,752

SYSTEMS PERMITTING RESPONSE BY ONLY SELECTED UNITS OF THOSE CONNECTED TO A SINGLE CHANNEL

Filed Nov. 19, 1953 5 Sheets-Sheet 5

INVENTORS
G. DONALD HENDRICKS
FRANK ARTHUR PEARSON
GEORGE LELAND RAMBO

Bruno C. Lechler

Attorney

United States Patent Office 2,826,752

Patented Mar. 11, 1958

2,826,752

SYSTEMS PERMITTING RESPONSE BY ONLY SELECTED UNITS OF THOSE CONNECTED TO A SINGLE CHANNEL

George Donald Hendricks, Campbell's Island, and Frank Arthur Pearson and George Leland Rambo, Moline, Ill., assignors to Eagle Signal Corporation, Moline, Ill., a corporation of Massachusetts

Application November 19, 1953, Serial No. 393,138

5 Claims. (Cl. 340—40)

The invention relates to systems wherein a control station is connected to a number of distant devices all of which normally respond in the same manner and simultaneously to commands sent out from the control station.

The invention constitutes a system which may be used in connection with such known systems and which permits selected ones of the local devices that are all connected to the same channel or circuits leading out from the control station to respond to a proposed change of operation.

Thus a city may be supplied with a traffic control system that includes local controllers of the type shown in the Pearson Patent 2,624,793, granted January 6, 1953, each controller having 7 or more terminals, corresponding terminals of all controllers connected in parallel to a master controller. This group of 7 wires may extend through buried conduits under busy city streets to the master controller. As the city grows, more intersections have to be controlled, and, whereas hitherto all controller patterns were changed at the same time by the master controller, it is now desired to change the pattern of only specified controllers at a given time. The cost of replacing all the existing controllers and to run additional wires to the central station would be prohibitive.

The invention provides equipment consisting of a coder and a translator installed at the central station and a decoder and a responder installed before each local controller that permits removing all but one of the 7 or more existing circuits connecting the local controller and the master controller at the central station at present, and still feed into the 6 or 7 lines leading into each local controller the proper current at the proper time.

In the simplest systems the local devices are merely started or stopped by the control station. The invention is equally applicable to systems in which the local devices can operate according to a number of patterns independently of a master controller at the control station and the system then provides for changing the pattern of operation of the local devices. Used in connection with such a system, the invention allows changing the pattern of operation of some of the devices in the system while the other devices in the system continue to operate according to the same pattern as they did before.

In its basic form the invention permits a given lot of devices to be assigned to various overlapping groups—so that some devices belong to different groups but some belong to both groups—and allows anyone of these groups to be selected to receive the command from the master controller that is about to issue.

In a modified form of the invention the master may send out two types of commands and one of these types of commands goes through to every local device while the other type of command goes through only to the group selected.

In still another modification of the invention where each one of the local devices operates on one of several different time cycles, the synchronizing signals for each of the time cycles are sent to every device and those devices that are in step will respond only to those synchronizing signals that are intended for them. However any device that is out of step will not remain idle until the proper synchronizing signal for that device comes but it will respond to the next signal that arrives. If that is not a signal whose spacing is designed for the device that is out of step, the device will complete one cycle of operation, then pause for some other signal. This procedure continues until the device, by a succession of delays, has fallen behind enough to be started by the proper signal. After that, it will keep its step with that synchronizing signal.

By this procedure the delay that is required to bring the device back into step is spread out over several cycles.

By way of illustration there may be 100 local devices number 1 to 100, these may be grouped in various ways so that there are 6 groups numbered A–G. In the basic form the master controller may send out one type of command and this goes only to the selected group. In the modified form two types of commands-one type R, the other type S are sent, R goes to the devices in the selected group, S to all the devices.

If we assign numbers to the local devices, the invention permits, by way of illustration, setting local device number 8 to respond to coded signals calling for group B only. Local device number 14 may be set to respond to group B and also to group A; local device number 17 may respond to groups A, B, D; while local device number 39 may respond to groups A and E.

If the command is to be carried out by devices in group A, devices number 14, 17, 39 will all respond. If the signal is for group B, devices number 8, 14, 17 will respond. If the signal is for group D, only device 17 will respond and if for group E, only device number 39 of those here enumerated.

In the modified form, when the master sends out the two types of commands S and R, only those local devices that fall in the group that is selected at the master controller will respond to the command R. However all the devices will respond to the command S regardless of whether they are in the group last chosen or not.

While the invention is not limited for use in connection with known systems of controlling local controllers in a highway traffic system, such a system may be used as an illustration of the operation of the invention.

In this illustration the traffic flow at street intersections is controlled by lights. These lights are under the control of a device referred to as a "local controller." In many systems the local controller is supplied with local current and contains the necessary timing devices to change the traffic lights from green to red with an intervening amber time interval.

At some central location there is a master controller which has two functions—to keep the local controllers synchronized and to change their operation from one pattern of operation to another. One pattern may give a long time interval for travel in one direction across an intersection, another pattern may give the long time interval to travel in another direction, or it may differ otherwise in the sequence of events.

Referring to the preceding illustration, the master controller may give out a periodic synchronizing command of the type called S above, which is to go to all the local controllers to keep them in step. At other times, such as when the traffic flow changes in character in the evening, the master controller sends out a signal that changes the pattern of operation of the local controller-type R above. Hitherto the two signals had to be applied to all the local controllers in the system. The invention permits sending signals of the type R to selected groups of local controllers while the signals S go to all controllers.

The invention can be applied to existing systems, it is not limited to new installations. In the basic form the invention comprises a coder and a decoder and a connecting channel. The coder is placed near the master controller and sends out a coded signal which is different for each of the groups A–G above.

In the modified form, the invention also includes a synchronizer.

The coded signal, and the signal that is to go to all the controllers such as for synchronizing, are all sent over a single channel to the decoders that are placed alongside each of the existing local controllers. The decoder allows signals of the S type to pass through to all the local controllers but screens signals of the R type. A decoder responds to the coded signals to let R type signals pass to the local controller only if that decoder is set to respond to the selected group for which a coded signal is sent out.

Hitherto if a device got out of step it would have to remain idle until the next synchronizing signal came. In the case of a traffic signal system working on a sixty second cycle, if the local controller got out of step, the traffic signal might remain unchanged for as much as fifty seconds before another synchronizing signal came, thus snarling up the traffic flow. In the present invention the device will start when the next signal of any type arrives. One may come along in five or ten seconds. Thus traffic at the intersection is delayed only five or ten seconds at a time, not fifty seconds. If the signal that starts the cycle is not one of those spaced to accord with the normal time cycle of that device, it will again pause after it has completed one cycle. There may be another delay at five or ten, or even fifteen seconds, until some other signal arrives to start another time cycle. But at each start the time delay required to get in step is decreased from the original fifty seconds so that traffic is not delayed at one time the full time needed to get in step.

While the devices may be local traffic controllers as used in the illustration and will be referred to as local controllers hereinafter, they may be local controllers applied to control any equipment.

The local device may be inactive except when it receives a signal or it may be independently active, operating on a selected pattern until it gets a new signal. In the later case the local controllers which in existing systems, such as that shown in Patent 2,624,793, granted F. A. Pearson on January 6, 1953, are normally in direct connection with the master, must now function at times while cut off from direct connection with the master controller. To maintain these local devices, or controllers, in operation a relay unit is provided that will supply local current through the cut-off portion of the wire that used to run directly back to the master controller until the particular controller is again included in a group and again connected to the master controller. The current is then shifted from one wire to another. After such a shift the relay system will maintain the current on the newly selected wire leading to the local controller and take it off the formerly activated wire.

The invention requires only a single channel connecting the coder at the master controller to a decoder at each local controller. The single channel may consist of a pair of wires, a single wire, a radio frequency, a carrier current superimposed on some existing line, or any other means, not necessary electrical, that transmits a signal from the coder to the decoders.

Any type of signals suitable for transmission over this channel may be combined into coded signals that energize a particular group of decoders.

In its most complete form the invention contemplates replacing the master controller by a modified one, adding a coder, placing a decoder alongside each local controller, and supplying relay units to be placed between the decoder and the local controller.

It may be pointed out here that the local devices or controllers may be scattered over a wide area, that the connecting wires or channels may be in conduits or buried below pavements. One of the features of the invention is that it can be used with existing systems, installed or contemplated.

In the basic form of the invention here used for illustration, only one type of signal is used. Furthermore, all coded signals consist of the same number of these signals. Selectivity is secured solely by the varied spacing of the signals.

We will assume that the single signal used consists of current flowing in a line for a fixed short time, or of a tone on the radio frequency sent out for fixed short time. We will further assume that there are a fixed number of these signals in each coded signal and these signals will be referred to as "pulses," and that the several coded signals differ only in the spacing of the "pulses." We will further assume that the intervals between pulses are of two types, a short normal pulse and a long pulse. Using N for a normal interval and L for long interval we may have one code P N P N P N P N P which we will call code A and another P N P L P N P L P which we will call code B and still another P N P L P N P L P which we will call code C.

The decoders will be of such a nature that one decoder will respond to all coded signals except those with a long interval after the second pulse. That decoder will not respond to code B or C. It will be seen that the decoders may be arranged so as not to respond to more than one code, also that if the intervals of a coded signal are all short, every decoder will respond to that coded signal.

The coder may consist of a manual sending instrument similar to a telegraph key tapping out the pulses with long and short intervals. In the preferred form the coder preferably includes a device having a number of circular cams with unequally spaced teeth that open and close switches to send out the desired coded signal. Current is of course placed only on the switch controlled by the one cam that corresponds to the coded signal to be sent.

One way in which a decoder may distinguish between differently spaced pulses includes an arm that moves by a number of steps from an initial position to a final position. If the arm reaches the final position, a path is opened for the command of the master controller to pass on to the local controller. Each decoder has the same number of steps and the arm of each pauses at a different stop between successive pulses.

Means are provided at certain positions of the arm in each decoder, and these means are located at different steps of the arm in different decoders, that will prevent the decoder from responding to any code having a long interval between the pulse that brought the arm into that position and the next pulse. Thus a given decoder may have such a means at the second and the fourth positions of the arm. If a given code has no long interval between the second and the third, or between the fourth and the fifth pulses, the arm will pass under succeeding pulses onto the final position and open the path to the local controller. But any code having a long interval at either of these points will cause the arm not to reach that final position.

In the form of the invention illustrated the decoder has an arm that is moved forward one stop by each pulse received. The arm rests against a different contact at each step and a contact at the last step leads to the device that actuates the local controller. The arm carries no current during the pulse or during a short interval, but it does carry current during a long interval. Some intermediate contact—different ones in each decoder—are connected to a device that causes the arm to return to its initial position. Thus, if the second position of the arm places it against a contact connected to the release arm device, the decoder will operate in this manner.

If the interval between the second and the third pulse is short, there is no current in the arm and when the third pulse comes the arm will move forward. The total number of pulses in the coded signal is just sufficient to carry the arm to its final position. But if the interval between the second and the third pulse is a long one, current will come onto the arm, the arm will be allowed to go back to its initial position. The arm will again respond to the remaining pulses but it will be behind schedule and will not have reached the final position when the last pulse comes.

In that modification where two different types of commands are to be sent over the single channel, those of the type S that are to go to all local controllers and those of the type R that are to go only to the controllers in the selected group, a different signal is used to form the coded signal for selecting the group and for sending a command of the S type. The decoder is designed to distinguish between these two signals and to transmit to the local controllers all the signals of the S type. Thus, if the pulses above described as forming the coded signal that selects the group that is to respond are all short pulses, and the pulse used to send out the S type of signal is a long pulse, it is easy to provide a by-pass in the decoder that transmits the signal to the local controller.

Thus the invention provides a coder and a decoder connected by a single channel that can be installed on existing systems where a number of wires run directly from the master to each local controller. The coder prevents a conflict of signals by making it impossible to send an S signal while an R signal is being sent out.

The invention is also applicable to those systems where the master and the local controllers are connected through a system comprising a translator, a single channel and a function selector. In that case the same single channel serves both to connect the coder and the decoder and the translator and the function selector.

The coder sends its signal first, the translator sends its signal to all the decoders that have been made responsive, and these decoders transmit the translator signal to the function selector. The function selector then functions as shown in application 378,057 filed September 2, 1953.

The object of the invention is to provide a method and apparatus which may be applied to existing systems wherein a master controller governs the change of operation of a number of devices, permitting the master controller to change the pattern of operation of some, but not all of the local devices.

Another object of the invention is to provide a system needing but a single channel which will be applicable to existing systems whereby a master controller designed to act upon all devices in a system can act only on selected groups.

Another object of the invention is to provide a system applicable to existing systems whereby a master controller designed to act upon all the devices in a system will act upon only selected groups when certain ends are to be achieved but will act on all devices to accomplish other ends, such as synchronizing.

Another object of the invention is to provide a synchronizing device which will transmit to all the local devices synchronizing signals designed for different patterns of operation and have each local device during normal operation respond only to those synchronizing signals intended for that pattern of operation.

Another object is to provide means for dividing up between successive cycles the delay that arises when the local controller misses its synchronizing pulse and cannot be synchronized until the next pulse of that type comes along.

Still another object is to enable synchronizing signals for each of a number of time cycles to be sent over a single channel, each synchronizing the one set of cycles and also serving to spread out between successive cycles the delay that arises when any one device gets out of step.

Figure 2:
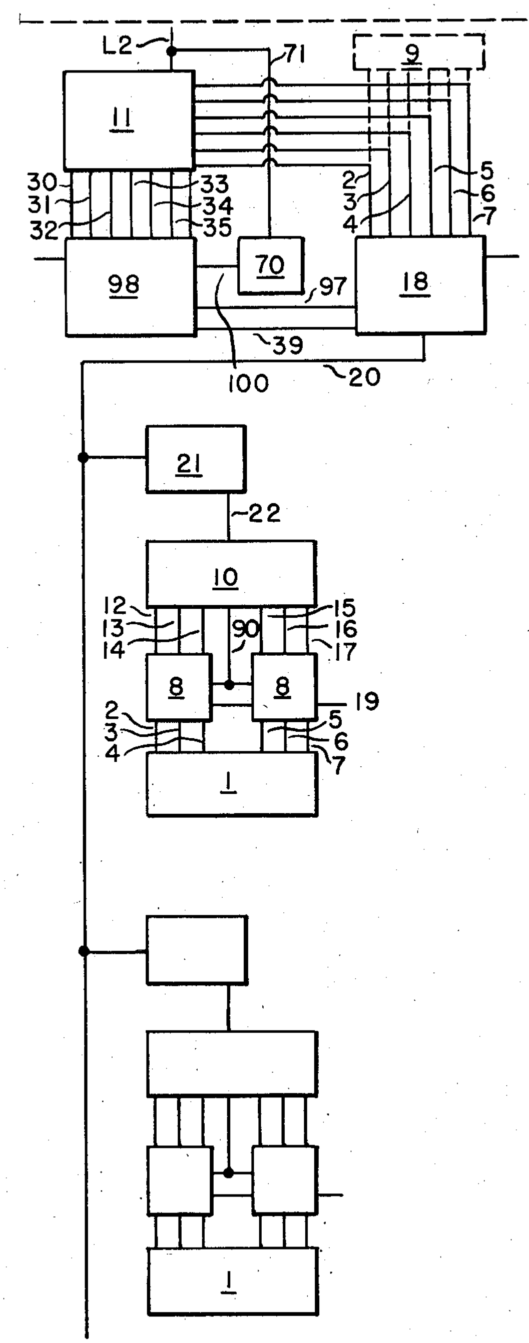
Figure 2 shows a similar system in which the master controller is connected to each of a number of local controllers only by a single channel.
Figure 3:
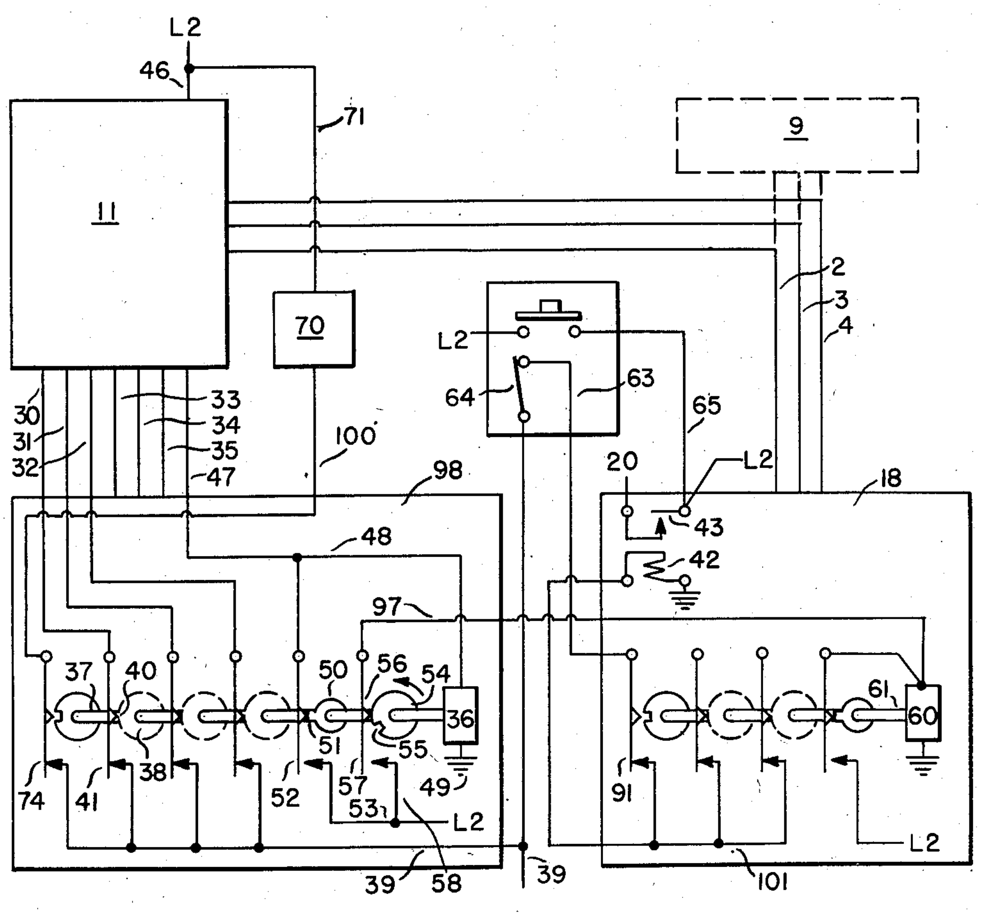
Figure 3 shows the new master controller, the coder and the translator which transmits the signals and the commands.
Figure 8:
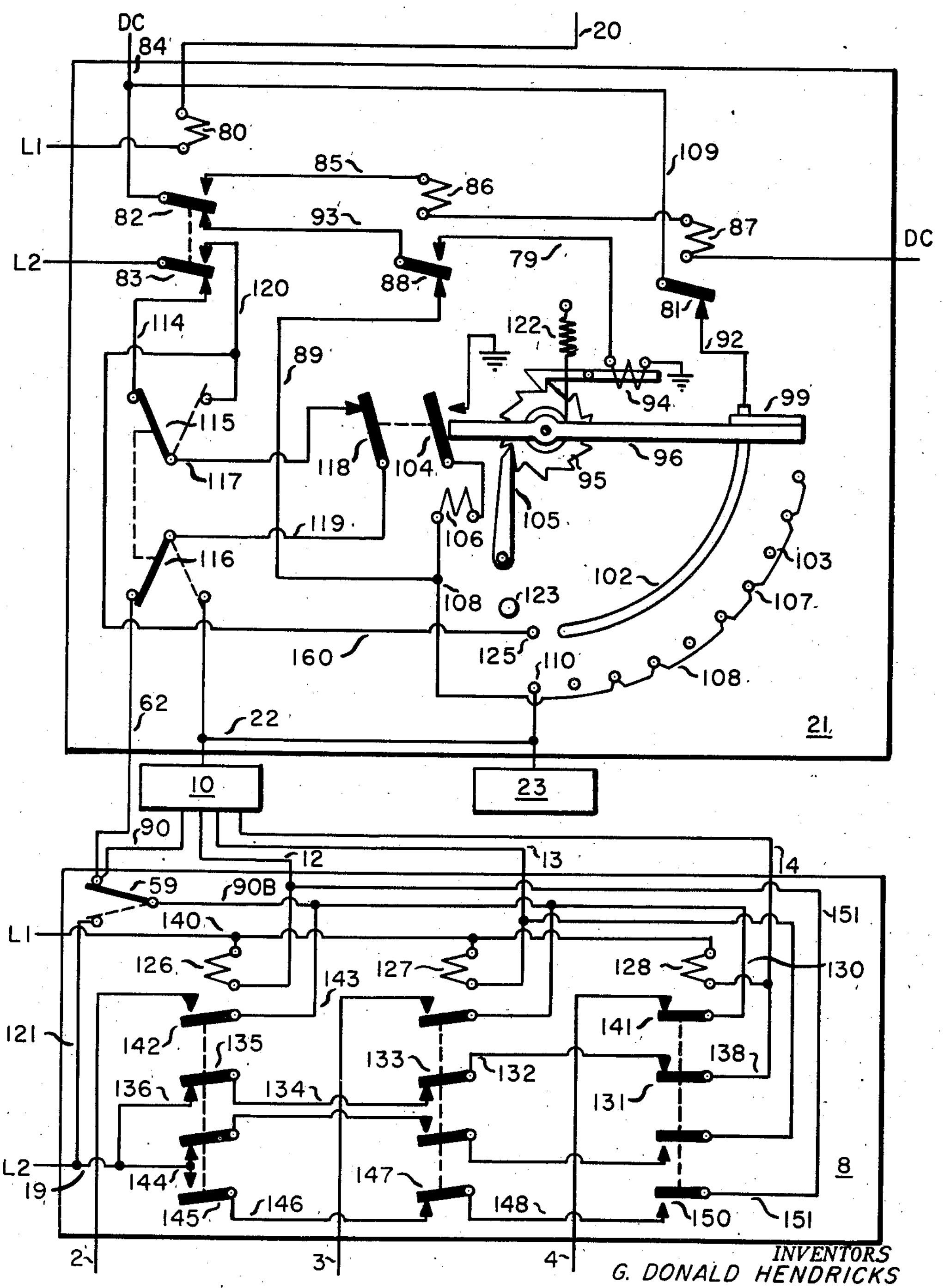

Figure 8, taken together with Figure 3, presents a complete circuit diagram for the form of the invention shown in Figure 2.

In both of these systems there are a large number of local controllers 1, only two of which are shown, each of which is adapted to control the operation of some apparatus according to one of a number of patterns of operation. The particular operation desired is secured by placing current on the proper wire, or wires, 2, 3, 4, 5, 6, 7. While six wires, forming two groups of 3 each are shown by way of illustration, there may be any number of such wires. They may be arranged in one, two, or more groups. While the drawing shows only two local controllers, it will be understood that wires 2—7 will extend to a large number of controllers, in fact, to all the controllers in the system.

Figures 4, 5:
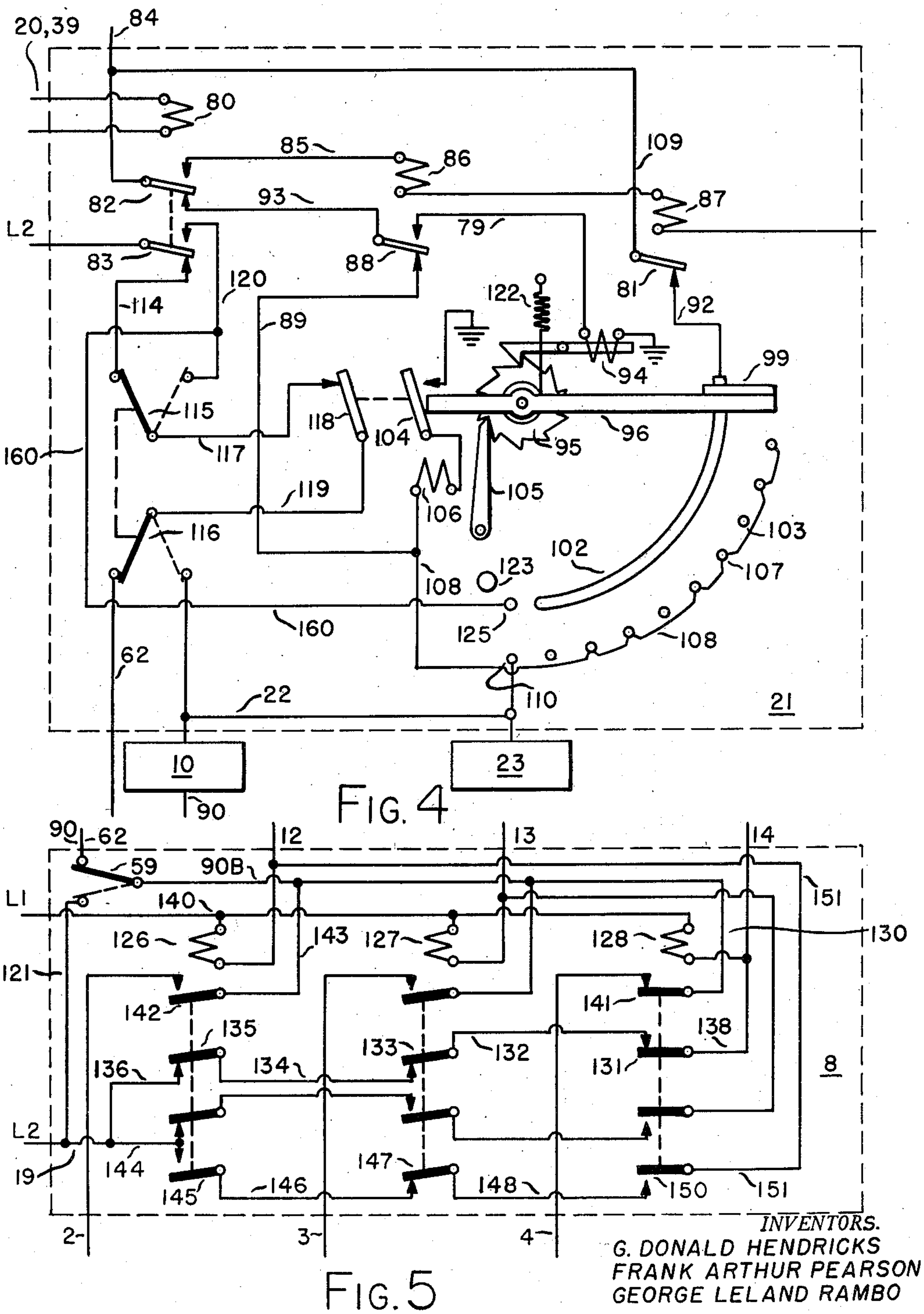
Figure 4 shows a decoder in detail.
Figure 5 shows a relay unit in detail.

The proper wire is energized by a relay unit 8. The function selector 10 combined with such a relay unit is described in detail in the application filed by Hendricks et al. on September 2, 1953, bearing Serial Number 378,057, and need not be described here in detail. The relay unit is also shown in Figures 5 and 8 and described below. In both of these systems a time controlled master controller 11 is able to change the pattern of operation of local controllers by supplying current to the proper wire, or wires, 12, 13, 14, 15, 16, 17. In the system shown in Figure 1 the wires 2—7 extend to the vicinity of each of the local controllers while in the system shown in Figure 2 these wires terminate at a translator 18, which sends a coded message over a single channel 20 which ultimately reaches the function selector 10 which includes or is associated with a relay unit 8.

Figure 1:
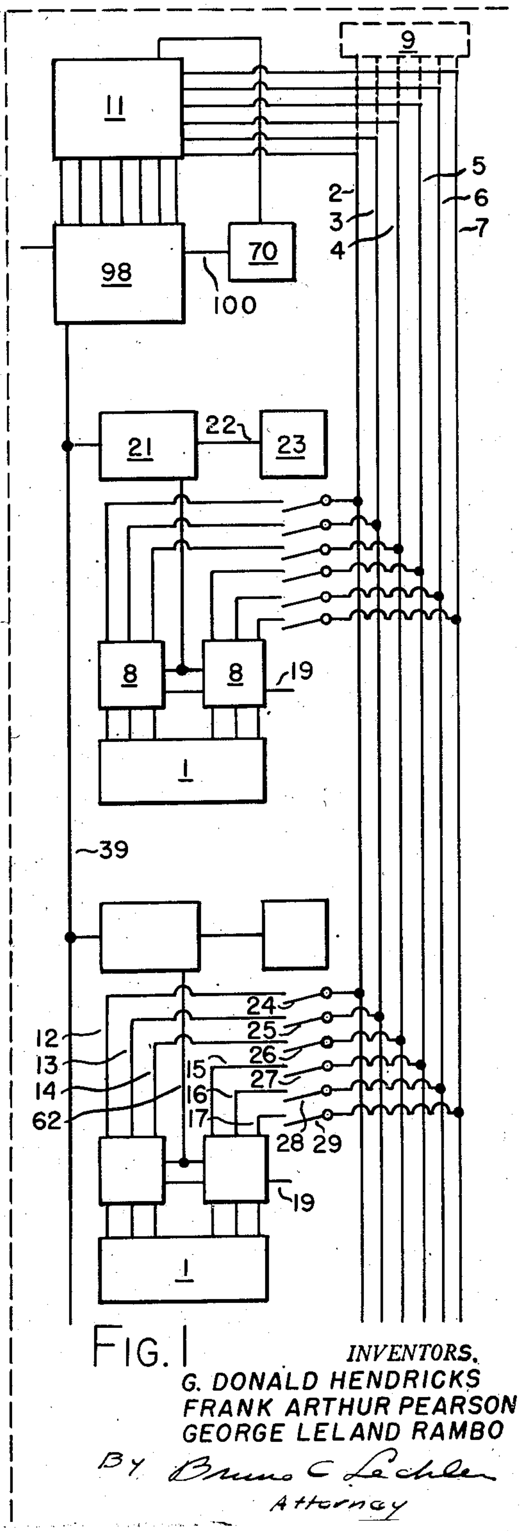
Figure 1 shows a system in which a coding unit is used with a master controller that is connected to each of a number of local controllers by a number of channels. The coding unit, in connection with decoding units, causes certain selected controllers to respond to a change of pattern of operation demanded by the master controller.

In both systems a decoder 21 determines whether the particular local controller shown is to respond to the master controller's next command or not. If the signal received by the decoder is such that the particular controller is to respond, the decoder will send the signal over line 22. In Figure 1 this will energize a relay 23 which closes switches 24, 25, 26, 27, 28, 29. In Figure 2 the signal passing over line 22 will actuate the function selector 10 and ultimately a relay unit 8 will connect the power to the proper line or lines 2, 3, 4, 5, 6, 7.

The relay unit 8, whose functioning is fully described in the application referred to, contains a number of relays, one connected with each of the lines entering the unit. Upon the actuation of either one of lines 12, 13, 14, one relay will put current from a local source 19 on the corresponding lines 2, 3, 4 and take the current off the other lines. The circuits are such that a relay thus actuated by one of the lines 12, 13, 14 will stay locked until another line is actuated by the master controller. The same is true in Figure 2 where one or more of the wires 2, 3, 4 are energized from a local source 19 and all other wires in that group are deenergized on a signal from the function selector 10.

In both systems the decoder 21 responds to a coder 98 placed adjacent to the master controller. The coder sends out a signal which determines which of the local decoders shall place their relay units in condition to respond to the master controller, and having sent out this message, the coder permits the master controller to send out the command that causes the change in the pattern of operation of the controllers that have been selected to respond. The coder could be actuated manually but is shown as actuated by a time controlled master controller 11. This master controller may include a number of switches actuated by a time clock or synchronous motor. Such a motor actuated set of switches, with a circuit 47 that is closed when the proper switch is to be energized is made by the International Business Machines Corp., their type 803 described in their Form 94-7285-0.

When the pattern of operation of some local controllers is to be changed this time clock will put current on the proper one of lines 30, 31, 32, 33, 34, or 35 to cause the coder to select the particular group of controllers whose pattern of operation is to be changed and also on that one of lines 2—7 which will initiate the desired new pattern of operation.

After the coder has formulated the proper signal and sent it out over single channel the decoder in Figure 1 will close the switches 24—29 and whichever line 2—7 has been given current will through the corresponding line 12—17 leading to a relay unit 8 cause current to be put on the proper one of lines 2—7 leading from the relay unit to the local controller.

In Figure 2 where the coded signal sent out by the coder flows over a single channel the line 97 leading to the translator causes the translator to send its coded signal to those function selectors 10 which have been selected by the coded signal that selects the proper group of decoding units. On those function selectors that have been selected, current will be sent to a relay unit 8 and the current from there will flow, as before, to the proper line 2—7.

In Figure 1 line 39 leads directly to the decoder 21 while in Figure 2, line 39 passes through the translator to a switch 91 in the translator that is normally closed, over line 101 to relay 42 which actuates switch 43. Whenever switch 43 is closed current flows from L2 to line 20, the single channel leading to the decoder.

Thus, in Figure 1 the signal passes directly to the decoder 21 while in Figure 2 the signal reaches the decoder through the translator over the same single channel 20 that sends all the other signals.

The coder 98 contains a motor driven unit 36 driving a shaft 37 carrying a number of cams. There is one cam like cam 38 for each code and this carries a series of teeth that engage a follower 40 on a switch 41. Each of these cams has a different arrangement of teeth. Although the shaft 37 turns all the cams over simultaneously only that cam whose switch is connected to whichever of lines 30—35 is alive sends signals over line 39. For greater clarity only 3 cams actuating switches connected with lines 30—32 are shown. There can be any number of cams 38.

Figure 7:
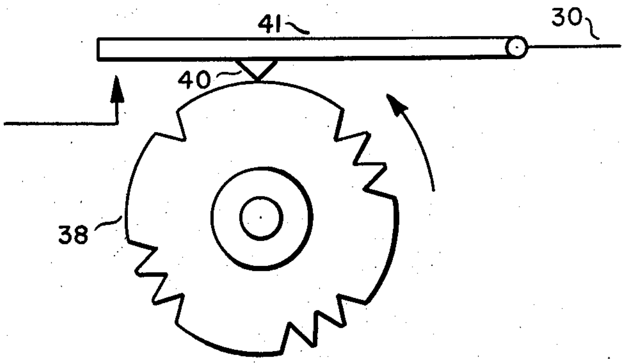
Figure 7 shows one of the cams in decoder and its associated switch.

By way of illustration, in Figure 3 one of the cams 38 actuating a switch 41 connected to line 30 and shown to a larger scale in Figure 7 may have teeth so spaced as to send out 3 short pulses, separated by short spaces, then after a longer space, three more short pulses separated by short spaces, then a long space, three more short pulses separated by short spaces, then a long space, and one more pulse. The cam controlling the switch on line 31 may send out the same number of pulses but differently spaced. When the time for a pattern change has come, the time clock closes a switch which allows current to flow from L2 over lines 46, 47, 48 to the coder motor 36 and thence to ground at 49. The shaft 37 also carries cam 50 which has a projection 51 that allows switch 52 to remain closed during the entire rotation of the shaft 37 but opening when the rotation is completed. This established a maintaining circuit for the coder motor 36 from L2 through line 53, switch 52, line 48 and coder motor 36.

The shaft 37 also carries a cam 54 having a notch 55 into which follower 56 of switch 57 falls only for a limited period just before the shaft 37 has made a full turn. This allows current to flow from L2 line 58, switch 57, line 97 to translator motor 60. The translator functions in the manner described in the application Number 378,057 transmitting over a single channel a coded signal corresponding to whichever line 2—7 has been energized by the master controller. As soon as the shaft 61 of the translator starts revolving switch 91 is opened which prevents another signal being sent by the coder before the translator has finished sending the coded command signal.

Thus it appears that the coder, actuated by an automatic clock, sends various combinations of short signals over line 39 that represent a particular group of local controllers that are to respond. In Figure 1 single channel 39 carries these signals directly to the decoder; in Figures 2 and 3 those signals pass over 39, switch 91 and single channel 20 to the decoder.

The line 39 is shown as passing through a switch 64 in the manual operation unit 63. This unit supplies current from L2 through line 65 to a single channel 20 in much the same manner as telephone dial system. While manual unit 63 is in operation, switch 64 is opened which prevents the sending signals by the coder.

It is also evident that after the coder has sent the message to select the local controllers that are to respond, a command is sent over one of the lines 2—7 either through switches 24—29 in Figure 1 or through the translator 18, decoder 21 and function selector 10.

The decoder shown in Figures 4 and 8 contains a sensitive relay 80 to which single channel 20 or line 39 lead. This relay moves switches 82 and 83. Switch 82 connects a direct current line 84 to line 85 everytime the sensitive relay closes. The first closing of the relay allows current to flow from line 84 over line 85 and energizes the two relays 86 and 87. 87 is a slow release relay and 86 a very-slow-release relay. Relay 86 moved switch 88 out of contact with line 89 and into contact with line 79. Relay 87 moved switch 81 out of contact with line 92. Each closing of relay 80 continues the actuation of these two slow release relays and as long as they are closed, line 93 is connected through switch 88 and line 79 with a ratchet relay 94. Every time that sensitive relay 80 is deenergized between short pulses, current source 84 is connected through switch 82 with ratchet relay 94. This ratchet relay steps a ratchet disc 95 along one step. Each step carries the arm 96 one step along and the sweeper 99 will connect the arc 102 with a different contact 103. As soon as the arm has begun to move, the switch 104 which is held open by the arm in its initial position will close and switch 118 will open. As the ratchet disc is moved along, the pawl 105 holds it in place but if the relay 106 is energized, the pawl is released and the arm is carried by a spring 122 back to its initial position shown in the drawing. Some contacts, 107, are connected through line 108 with relay 106. Line 89 also is connected with the relay 106. The arm can thus be returned to its initial position by energizing relay 106 in either of two ways.

If there is a short interval between successive pulses, both the slow release relays 86 and 87 will remain energized. But if the pause is somewhat extended, relay 87 will open but not 86. That will allow current to flow from a power source 84 over a line 109 switch 81 line 92 arc 102 sweeper 99 to either contact 103 or 107. If the arm happens to be resting on a contact 107, the circuit is closed through line 108 to relay 106 and the arm is released to be returned to its initial position by the spring 122.

The other way the arm can be returned is by the arrival of a very long interval at relay 80. Then the very-slow release relay 86 will open and this will close a circuit from 82 over line 93, switch 88 and line 89 to relay 106.

The decoder just described operates in the following manner. A number of short pulses separated by either normal or long intervals, arrive from the coder over the single channel at the sensitive relay 80. As each pulse arrives the relay 80 responds and moves switches 82 and 83. The first movement of switch 82 will energize slow release relays 86 and 87 and these will remain closed during the normal intervals. If a long interval occurs, only 86 will remain closed. Whenever a long interval occurs relay 87 opens and supplies current to the sweeper on the arm 96.

At the beginning of each short pause after the first pulse and on the arrival of this long pause, the arms 96 of every decoder in the system moved one step ahead. In some of these decoders the contact on which the arm now rests is connected to line 108. Those decoders in which the contact is thus connected will allow the arm 96 to go back to its initial position when the long pause has continued long enough to open the relay 87. On those decoders where the arm was on a contact not connected to line 108 each pause succeeding a short pulse will move the arm forward one step until it reaches contact 110. All further pulses will not affect the position of the arm which now bears against stop 123.

The sweeper has now left arc 102 and a circuit from L2 to line 22 is established every time the sensitive relay 80 closes in this manner; L2, switch 83, line 120, contact 125, sweeper 99, contact 110. The arm will remain in this position until there is a very very long pause releasing the very-slow release relay 86.

In this illustration of the decoder the sweeper 99 has been shown as moved along an arc by a ratchet and returned by a spring when the long interval comes while the sweeper is on a contact 107. It will be obvious to those skilled in the art that sweeper 99 need not move in a circular arc; that it might be stepped along a straight path, or any other path, and that the arrival of a long interval could return the sweeper to its initial position by various means other than a spring.

In the system shown in Figure 1 it is now only necessary to send a long pulse to hold relay 23 energized long enough to allow one of the lines 2—7 to transmit through the closed switches 24—29 the command of the master.

During this interval the master controller, through one or more of lines 2—7 will have sent a command which has passed on to relay unit 8 which has energized the proper lines 2—7 leading into the local controller.

In system shown in Figure 2, the coder, just before completing the revolution of its shaft, puts current on the translator 18 and the translator will put current on line 20 which will cause sensitive relay 80 in Figure 4 to close switch 83 and thus repeat over lines 120, 160, contact 125, bridge 99, contact 110, the coded message that will pass over line 22 and cause the function selector 10 to place current on the proper one of lines 12—17 to carry out the command of the master controller. These lines, leading to relay unit 8 will in turn energize the proper line 2—7 leading into the local controller.

In one adaptation, the relay unit shown in Figures 5 and 8, is normally supplied with energy through line 62. With the switches 83, 115, 118, 116, 59, all in the position shown, current normally flows from L2 in Figures 4 and 8 over the switches to line 62.

However, whenever a signal causes the sensitive relay 80 to close, this current will be interrupted. When a single long current pulse is received at relay 80 the flow of current over 62 to relay unit 8 will be interrupted. The devices that are fed with current by the relay unit may be of a type that periodically waits for a current reception to start again, or the resumption of current after an interruption during which the relay 80 is closed by a single long pulse.

The function of the holding-relay group is to connect one of the extensions 2, 3, 4 of each of wires 12, 13, 14 (Figure 5) to line 90 which gets current over switch 59 to the wire selected and to disconnect any wire that was previously drawing current from line 90. Each of wires 12, 13, 14 leads to one of the three holding relays 126, 127, 128. One of these relays is normally held closed by a holding circuit.

Figures 5 and 8 show the position of the switches while no signal is being transmitted over the single channel and therefore there is no current on any of the wires 12, 13, 14. One of the holding relays, 128 in the drawing, is held closed by a maintaining circuit that was established when the function selector 10 last functioned.

In the position of relays 126, 127 shown, current is flowing from L2 lines 19, 136, switch 135, line 134, switch 133, line 132, switch 131, line 138, through relay cail 128, lines 140 to L1 thus holding relay 128 closed after current over it has ceased.

This holds switch 131 closed and if no signals are being sent, current flows steadily from L2 in Figures 4 and 8 through switch 83, line 114, switch 115, line 117, switch 118, line 119, switch 116, to line 62 and, in Figures 5 and 8, line 62, switch 59, line 90 to line 130 then over switch 141 to line 4. If as a result of a new selection of patterns of operation current is sent either through wires 12 or 13 it flows through either relays 126 or 127 and line 140 to L1. Either switches 133 or 135 in the circuit just described are opened and holding relay 128 now opens for lack of a holding circuit, thus cutting off the flow of current into wire 4.

Thus, if current is placed on line 12, relay 126 closes, switch 135 opens, switch 142 closes. Current now flows from 90 to 143, to wire 2. A holding circuit is established from L2, line 19, line 144, switch 145, line 146, switch 147, line 148, switch 150, line 151 to line 12 through relay 126 and line 140 to L1 which will hold relay 26 closed after current entering on line 12 ceases.

The line 90 in Figures 5 and 8 may be supplied with current either from a decoder 21 through line 62 or from L2, line 19, and line 121 depending on the position of switch 59.

If the switch 59 is in the dotted position, whichever of the lines 2, 3, 4, is energized will remain continuously energized regardless of the functioning of sensitive relay 80 in Figures 4 and 8.

The invention thus far described permits changing the pattern of operation of selected local controllers by the command of a master controller and it has been shown that the invention can be adapted to either of two types of known systems, one having a plurality of lines running from the master controller to each local controller, and the other having only a single channel leading out to the local controllers.

In the modification about to be described, provision is made for the master controller to send out additional type of periodic signals that go to each local controller, regardless of whether it was included in the last group of controllers whose pattern of operations was changed.

These periodic signals may consist of a single long pulse. This pulse will be received by the sensitive relay 80 in Figures 4 and 8 of every decoder and in the manner already described, during the long pulse no current flows out over line 62.

In some systems, such as that shown in Figure 2, it may be desired that every relay unit periodically sends a synchronizing pulse rather than a synchronizing pause. Then the two switches 115, 116 are moved to their dotted position. Current will now flow only while current is on relay 80 from L2, switch 83, line 120, switch 115, line 117, switch 118, line 119, switch 116, line 22 which leads to the function selector 10 that transmits the synchronizing signal to relay unit 8.

Since switch 118 is opened when the arm 96 leaves its initial position, it is clear that there can be no conflict between coded signals designed to select which controller is to respond, or commands setting that controller to operate under another pattern.

Figure 6:
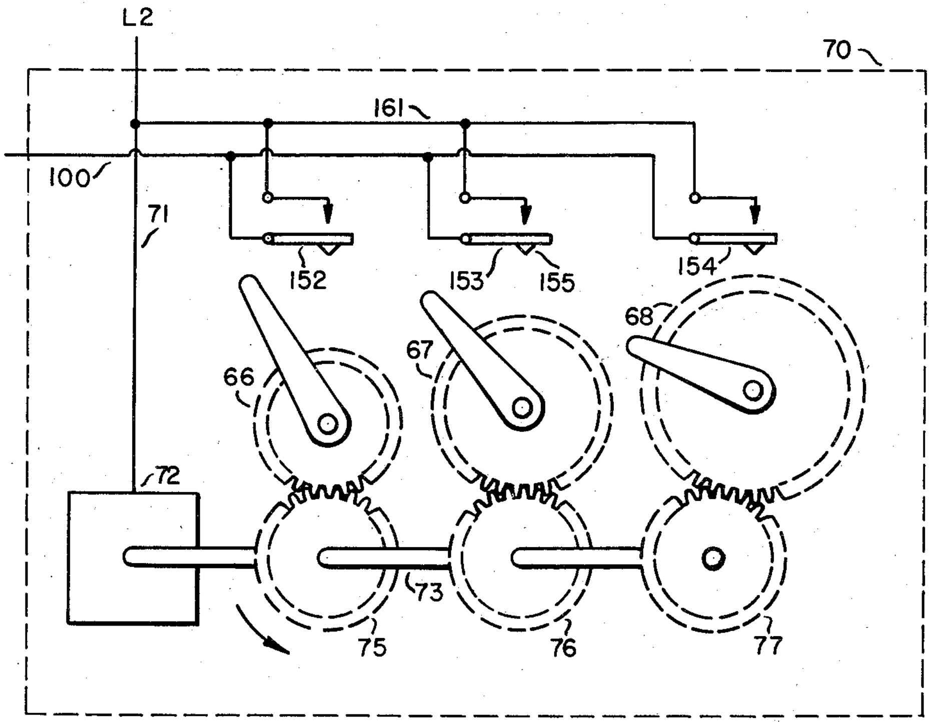
Figure 6 shows a synchronizer.

If these signals are to be used for synchronizing devices in the local controllers they may be sent by some such device such as the synchronizer shown in Figure 6 and indicated at 70. A line 71 leading from L2 may drive a synchronizer motor driving unit 72 that drives the shaft 73 at a constant speed. This shaft carries gears 75, 76, 77. Each of these gears drives another gear 66, 67, 68. Each of these last gears may carry an arm that closes one of the switches 152, 153, 154. Each of these switches connects line 161 leading from 71 to line 100. Thus, as the three arms revolve, each of the switches 152 to 154 will send out a signal.

The signals may be of different lengths either because they travel at different speeds, or because the followers are differently shaped at switches 152—154.

In many systems those local controllers that are operated on one pattern, let us say those whose pattern is initiated by line 2, are supposed to synchronize with the arm on gear 66, while those on the pattern of operation initiated by line 3 are supposed to synchronize with the arm on gear 67 and those which were initiated by line 4, with the arm on gear 68. In a system with selective selection of local controllers, it is clear that some controllers may be operating on each of these patterns while in the usual systems, where every controller responds to the same pattern change, all the controllers respond to the same gear. Accordingly, means must be provided whereby some local controllers respond only to the long pulses flowing from the switch 152, while other controllers respond only to long pulses from the other two switches. While only 3 switches 152—154 have been shown, there may be as many switches as there are different patterns of operation that need synchronization.

The local decoder will transmit all of these signals out over line 62 or 22 as may be elected by the placing of switches 115 and 116.

Each of these switches 152—154 sends its periodic long pulse over line 100 to the coder 98. There it passes over a normally closed switch 74 onto line 39. When the coder is used in the system shown in Figure 1 this line 39 may lead directly to each decoder 21 in the system.

In Figures 4 and 8 manually set switches 115 and 116 move together. In the position shown, current normally flows from switch 83 over line 114, switch 115, line 117, switch 118, line 119, switch 116 to line 62. However, when a coded signal is sent to the decoders, and the decoders are determining which controllers are to respond, the arm 96 will be moving away from its initial position and this opens switch 118 which will prevent any synchronizing signal confusing the signals intended to change the pattern of operation of local controllers.

Under normal conditions current is flowing through line 62 and when synchronizer 70 sends out a long pulse the sensitive relay 80 in each decoder, shown in Figures 4 and 8, will lift its switch 83 out of contact with line 114. Thus the current in line 62 is interrupted when the synchronizing is to take place and the current is restored to line 62 when the synchronizing pulse ceases and allows the switch 83 to be restored. The interruption of the current to line 62 is used to start a new cycle in all the local controllers operating on the same pattern.

If the local controller is on schedule, as it normally is, the interruption of the current in line 62 simply allows the local controller to proceed into the new cycle without interruption.

The local controller may be of the type shown in the patent granted to Frank Arthur Pearson on January 6, 1953, and bearing Number 2,624,793. This contains a synchronizing relay that is held closed by the outside current supplied through a line such as line 62. When the synchronizer 70 sends out pulses that interrupt the current flow through line 62 as described, the synchronizing relay opens for a short time.

The local controller operates with a motor supplied with current from a local source but when the local controller has completed most of its cycle—let us assume 97%—the circuit is changed to pass through a switch opened when the sensitive relay closed. After 97% of a cycle has been run, if the synchronizing relay is deenergized at that instant, the cycle will continue but if the synchronizing relay is energized the local cycle will come to a stop when 97% of the cycle has been completed, and start when the relay opens—which will be at the beginning of the synchronizing pulse sent out by the synchronizer. Since the local controller will then run through 97% of its cycle regardless of the position of the synchronizing relay, it is clear that it is immaterial whether other synchronizing pulses open or close the synchronizing relay during the 97% of the cycle that the local controller is operating on its own.

When synchronizing is done by three switches 152, 153, 154 in the manner described it will be clear that whenever the pulse sent out over line 100 by one of these switches begins one group of local controllers operating on a time cycle that corresponds to the time-interval between successive closings of that one of the three switches will be synchronized.

It has been indicated that each controller is responsive to a synchronizing pulse for only 3% of a complete cycle. Therefore other synchronizing pulses, coming between these synchronizing pulses will not affect the synchronizing of the local controller but these synchronizing pulses must not be so close to each other that the decoder or the function selector will treat the two signals as a single coded message. An appreciable time interval must intervene between the synchronizing signals so that the decoder and function selector will treat them as two independent signals.

One of the features of the invention is that while a number of different synchronizing pulses may be sent over the one channel, provision is made that these pulses will either coincide or be sufficiently far apart that they cannot function in combination as a coded signal.

This result is attained by arranging the number of gear teeth in the pairs of gears, 66, 75 or 67, 76 or 68, 77 so that the time required for each arm to make a complete revolution is a multiple of some time increment. Thus if the three arms all start at the same time and one makes a revolution in 40 seconds, one in 50 seconds, and one in 60 seconds, all being multiples of 5 seconds, at the end of two minutes the first arm has made three revolutions and the third arm two revolutions—their signals will start at exactly the same time. At the end of three minutes and 20 seconds the first arm has made five complete revolutions and the second four complete revolutions—again the signal will coincide exactly. At the end of five minutes the second and the third arm will be sending a signal at the same time.

If the time increment is longer than 3% of the longest cycle in the example chosen there is no chance of separate synchronizing signals coming so close together that they can be mistaken for a single coded signal and what is more important, since the gear drive will keep all the arms traveling at fixed speeds having a permanent precise relation, there can be no catching up of signals due to variations in motor speeds or slippage of the parts.

The transmission of these synchronizing signals through the relay unit 8 will now be traced. Assuming the relays are in the position shown in Figure 5, current is flowing steadily to line 4. In Figure 6 each of the switches 152, 153, 154 cause an interruption of current in line 4. Two of these three interruptions of current flowing in line 4 are not utilized in synchronizing local controller 1.

The local controller may lose time, but such loss of time is usually only slight. When about 97% of the normal cycle is completed according to the local controller's own timing mechanism, the local timing device stops and awaits the outside current to cease to open the synchronizing relay which will start the next cycle. Thus, if the cycle has been slow or fast, the last phase of the cycle will be lengthened or shortened to bring the cycle into step. When the next appropriate synchronizing pulse begins, the local controller starts on time.

In a simple example of traffic flow, if the traffic lights on a street are arranged to operate in cycles beginning with a green light, the green light will always start on one intersection to allow flow along the street when a green light at the next intersection allows traffic to flow on the cross street.

If the relay 8 is connected with a single channel system of the type shown in Figure 2, the switches 115, 116 Figure 4 are both moved to their dotted position. Whenever the timing switches 152, 153, 154 send a long pulse, this will be transmitted over single channel 20 and when sensitive relay 80 responds switch 83 will feed current from L2 over line 120, switch 115, line 117, switch 118, line 119, switch 116, directly to line 22 that leads to the function selector.

The function selector described in patent application 378,057, filed September 2, 1953, by G. Donald Hendricks et al., if used in system shown Figure 2, will send out current over line 90 to relay 8 except when the long pulses come. This current will flow over switch 59 to line 90 B. The result will be the same as that already described, when a long pulse comes the current flowing over line 4 to controller 1 will be interrupted and as the current is interrupted synchronizing is accomplished.

While the relay unit just described transmitted both R and S signals the relay unit 8 may also be used to transmit only change of pattern of operation signals—the type previously referred to as R Relay unit 8 is used to transmit only R signals when associated with lines 5, 6, 7 and in that event the switch 59 is set to contact line 121. Once a pattern has been changed and a relay unit has closed there will be no interruption of the current until the pattern of operation is again changed.

If on the other hand relay unit 8 is to be used to transmit both R and S signals—the latter signals coming at regular intervals and to be transmitted to all the local controllers, the relay unit switch 59 is set in the position shown on the drawing.

In applying the invention to an existing system, such as the systems shown in the Pearson and in the Hendricks et al. application referred to, the existing master controller 9 is replaced by the master controller unit 11. This unit is adapted to be connected to line 2—7 that were previously connected to the existing master.

If the patterns of operation on some of thees lines are to be synchronized, synchronizer 70 is added. The units 11 and 70 are connected to a coder. A single channel 39 is run either to the translator in the Hendricks type of system or to all the decoders in the Pearson type of system.

Where the single channel runs to the translator, an existing single channel that runs from the translator to all the function selectors is cut just before it enters the function selector and the decoder is inserted. Relay units are also inserted just ahead of each local controller.

The operation of a system incorporating the invention will now be described.

The unit 11 is set up to change pattern of operation at various times during the day or even week. Thus unit 11 may be set up to change the pattern of operation at 4 p. m. on a week day on those local controllers belonging to the group controlled by line 30 to the pattern of operation initiated by line 4.

The unit 11 in this example will connect lines 30 and line 4 to a power source a few seconds before 4 p. m. Nothing happens as there are open switches in the coder and the translator. Precisely at 4 p. m. the device 11 places current on line 47 for a short period. This suffices to start the coder motor 36 and the coder 98 sends out over line 39 the signal that identifies the group of local controllers associated with the code transmitted by the cam associated with line 30. These signals, consisting of short pulses differently spaced go out to all the decoders such as the decoder shown in Figure 4. In those decoders that are to respond to that code the arm will reach contact 110.

If the system is of the type shown in Figure 1, the decoder then sends current over line 22 to relay 23 that closes switch 26 and current will flow from the energized line 4 over switch 26, line 14 to a relay unit 8 shown in Figure 5. The current will pass through relay 128 and onto line 140 to L1. The relay will close switches 131, 141, 150 as shown, and this will allow current from a local source L2 to flow over 19 line 136, switch 135, line 134, switch 133, line 132, switch 131, line 138 to relay 128 forming a maintaining circuit that will continue after the time clock has interrupted the flow of current through lines 30 and 4 and switch 26 has opened. With switch 141 held closed, current from line 90B flows over switch 141 to line 4. If there was current on either lines 2 or 3, the energization of the relay 128 in the manner described opened relays 126 and 127 and the switches controlled by them that fed current to line 2 or 3.

In the system shown in Figure 1 when the synchronizer 70 shown in Figure 6 sends its periodic long pulse over line 100 in the manner described, it flows over switch 74 in the coder 98, which is at rest at this time, to the line 39 and thence to sensitive relay 80 in every decoder which breaks the current flow from L2 over switch 83 to line 62 that leads to line 90B of Figure 5, thus transmitting the current interruption to line 4.

If the system is of the type shown in Figure 2 the decoders that have responded, connect line 160 and line 22 over bridge 99 so that command signals can cause current to flow from L2 over 83 and lines 120, 160, to line 22 and thence to the function selector 10.

As the coder 98 finishes sending the coded message that enables the decoder of the right group to respond, its cam 54 starts the translator. If line 4 has been energized by the main controller 11, the translator formulates a command code by one of the cams turned by motor 60 and this command goes over line 20 immediately after the coded message that selected the decoders have passed over line 20. This last command code is passed by switch 83 to the function selector 10 over line 22. The function selector now responds to the command code to put current on the proper outgoing line, 14 in this case. This line leads to the relay unit 8 and this unit functions in exactly the same manner as was described in connection with Figure 1.

When decoder 21 is used in the system 2 the switches 115 and 116 are in their dotted position and when the synchronizing pulse moves the switch 83 the current from L2 flows over switch 83 in the manner described directly out over line 22 to the function selector.

The function selector, described in the patent referred to, is adapted to cut the current flowing into one of the lines leading to the local controller from the relay unit while a synchronizing pulse is thus flowing over line 20. In this manner the local unit is synchronized.

The functioning of the relay unit in system 2 has been shown where both R and S signals are to be transmitted.

If the particular relay unit controls pattern changes that are not to be synchronized, the switch 59 is placed in its dotted position.

We claim:

1. In a traffic control system local controllers of a type having a plurality of terminals, current on any particular terminal causing the controller to operate on a particular cycle, a central station having a coder adapted to send out a coded message of spaced short pulses, a single channel leading to a plurality of locations, a decoder at each location that is set to respond to a particular coded signal, a translator at the central station set in operation on completion of the first coded message adapted to send a second coded message over the single channel and those coders that have responded to a responder that selects a particular terminal of the local controller, a third signal sent over the single channel over the decoders that have responded and the line leading through the selected terminal that closes a self locking relay that placed current on the selected terminal of the local controller from a local source and removes it from other terminals.

2. In a traffic control system local controllers of a type having a plurality of terminals, current on any particular terminal causing the controller to operate on a particular cycle in synchronism with a master timer, a central station having a coder adapted to send out a coded message of spaced short pulses, a single channel leading to a plurality of locations, a decoder at each location that is set to respond to a particular coded signal, a translator at the central station set in operation on completion of the first coded message adapted to send a second coded message over the single channel and those coders that have responded to a responder that selects a particular terminal of the local controller, a third signal sent over the single channel over the decoders that have responded and the line leading through the selected terminal that closes a self locking relay that places current on the selected terminal of the local controller from a local source and removes it from other terminals, a relay responding only to a single long pulse at each location that causes the synchronizing long pulse a bypass the decoder and to cut off the supply of local current used to initiate a new cycle from the controller during the time the long pulse is on the single channel.

3. In a system comprising a central station and devices at a plurality of distant locations, in combination, a central station, a single channel leading from the central station to all distant locations, means at the central station to send a first series of relatively short signals over the single channel at time intervals that are all the same multiples of a basic time increment, means at the central station to send a second series of relatively short signals over the same single channel at time intervals that are all equal but a different multiple of said basic time increment, a device at one location whose operation is initiated by any signal sent over the single location and which runs for a period slightly less than the time intervals between the first series of signals, a second similar device at another location which when initiated by any signal received over the single channel runs for a period slightly less than the time interval between the second series of signals.

4. In a system of the type described in claim 3, means at the central station comprising a power source, a plurality of normally open switches each adapted to connect the power source to the single channel, means to close one switch for relatively short periods at intervals that are one multiple of a time increment and to close another switch at intervals that are a different mutiple of the same time increment.

5. In a system of the type described in claim 3, means at the central station comprising a shaft revolving at a constant speed, a plurality of pinions carried by said shaft, gears meshing with the respective pinions so selected that each gear makes one revolution in a different time interval, a power source, a plurality of normally open switches each adapted to connect the power source to the single channel, means carried by each gear to close one of said switches at time intervals related to the time required by that gear to complete a revolution.

References Cited in the file of this patent

UNITED STATES PATENTS

| | | |
|---|---|---|
| 747,979 | Hood | Dec. 15, 1903 |
| 1,343,256 | Field | June 15, 1920 |
| 1,381,451 | Conn | June 14, 1921 |
| 1,749,444 | Rae | Mar. 4, 1930 |
| 1,814,524 | Nelson | July 14, 1931 |
| 1,888,985 | Hershey | Nov. 29, 1932 |
| 1,919,046 | Scriven | July 18, 1933 |
| 1,945,470 | Steeneck | Jan. 30, 1934 |
| 1,972,289 | Chauveau | Sept. 4, 1934 |
| 2,180,948 | Bassett | Nov. 21, 1939 |
| 2,214,253 | Lomax | Sept. 10, 1940 |
| 2,269,246 | Bloomfield | Jan. 6, 1942 |
| 2,275,147 | Hershey | Mar. 3, 1942 |
| 2,345,136 | Lomax | Mar. 28, 1944 |
| 2,440,118 | Reinhold et al. | Apr. 20, 1948 |
| 2,543,608 | Stamper | Feb. 21, 1951 |
| 2,610,239 | Sheperd | Sept. 9, 1952 |
| 2,624,793 | Pearson | Jan. 6, 1953 |